UNITED STATES PATENT OFFICE.

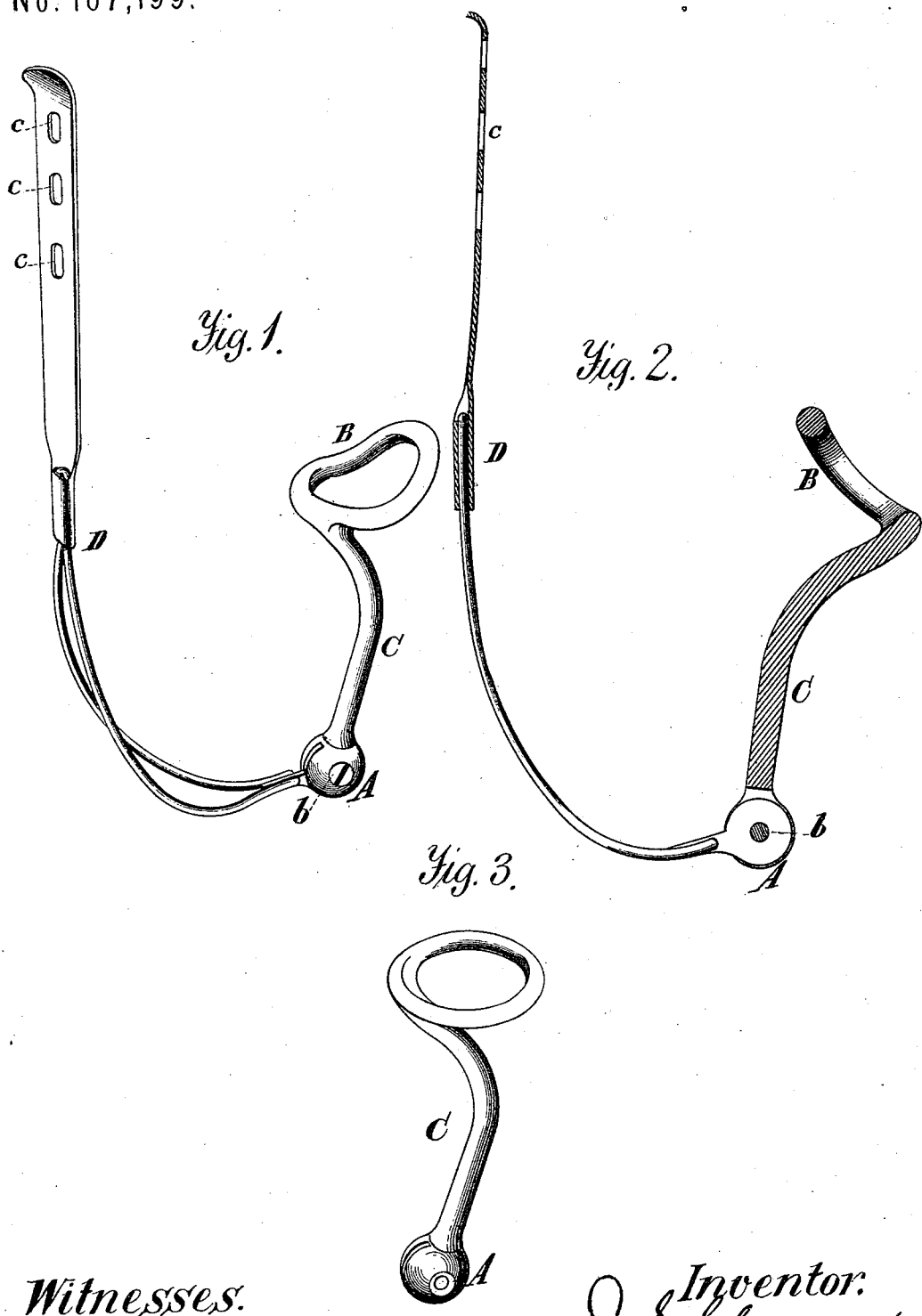

JAMES S. SHANNON, OF CHICAGO, ILLINOIS.

IMPROVEMENT IN UTERINE SUPPORTERS.

Specification forming part of Letters Patent No. 167,199, dated August 31, 1875; application filed July 23, 1875.

CASE B.

*To all whom it may concern:*

Be it known that I, JAMES S. SHANNON, of Chicago, in the county of Cook and State of Illinois, have invented certain new and useful Improvements in Uterine Supporters; and I do hereby declare that the following is a full, clear, and exact description thereof, which will enable others skilled in the art to which it pertains to make and use the same, reference being had to the accompanying drawing and to the letters of reference marked thereon, which form a part of this specification.

Figure 1 shows the instrument as applied to the treatment of retroversion of the uterus; Fig. 2, the same ring and stem reversed by means of the joint A for the treatment of anteversion, and Fig. 3 the cutter-ring which I use for simple prolapsus.

The object of my invention is to make an instrument equally adapted to the treatment of anteversion and retroversion of the uterus, to which phases of the disease other instruments are not so well adapted, however efficacious they may be in simple prolapsus.

I find this end best attained by the use of a ring having a lateral curvature, B B, supported by a stem, C, bent at about two-thirds its height, as shown, the ring being so attached that the side opposite the point of attachment to the stem may be considerably elevated, thereby more perfectly supporting the uterus in either retroversion or anteversion. The stem C is attached to the metallic spring D by the hinge-joint A. The spring is attached to a belt by the slots $c\ c\ c$.

By withdrawing the screw $b$ from the joint A the stem may be reversed, and applied either to retroversion or anteversion.

For simple prolapsus I use the ordinary cutter-ring supported by the bent stem, Fig. 3.

The stem and ring are of vulcanite or hard rubber, and by immersion in hot water may be made flexible, in which state they may be made to take any form suited to a particular case should the ordinary form be not suitable.

The joint A allows the pessary to adapt itself to all the motions of the body, or the screw may be so tightened that the stem may be held rigidly in any desired position.

I am aware that the curved ring B and the bent stem C are old, and do not claim these devices; but by my arrangement upon the reversible hinge-joint the same stem and ring, without bending, may be used either for anteversion or for retroversion.

I therefore claim—

The arrangement of the bent stem C with the curved ring B and the hinge-joint A of the pessary-supporter D, said stem being reversible and adapted for use in either retroversion or anteversion, as and for the purpose described.

In testimony that I claim the foregoing as my own invention I affix my signature in presence of two witnesses.

JAMES S. SHANNON.

Witnesses:
 CHARLES D. LUSK,
 GEO. H. STONE.